Oct. 9, 1928.
E. O. GULSETH
FOLDABLE MILKING PAIL HOLDER
Filed March 1, 1927
1,687,242
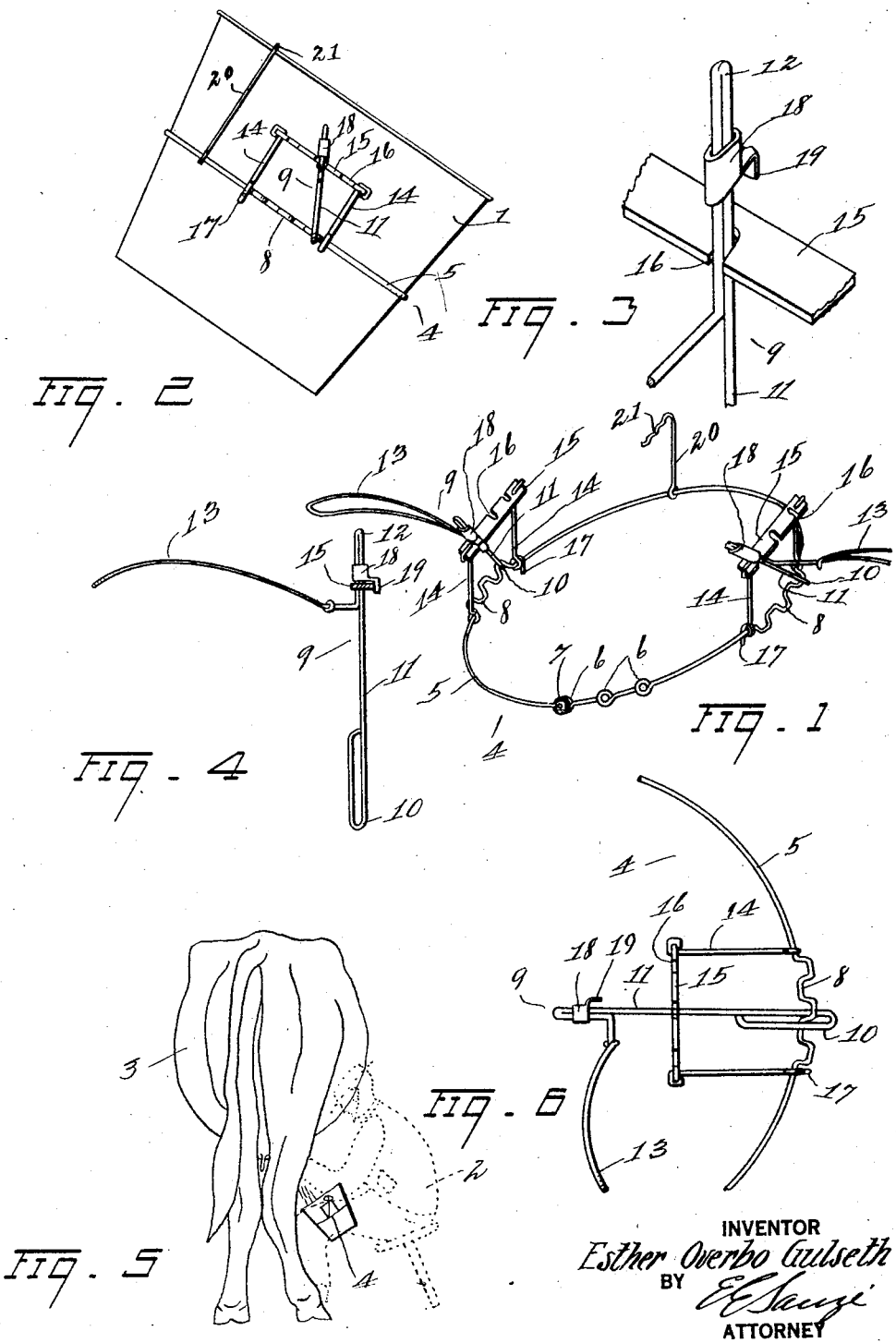
INVENTOR
Esther Overbo Gulseth
BY
ATTORNEY Patented Oct. 9, 1928.

1,687,242

UNITED STATES PATENT OFFICE.

ESTHER OVERBO GULSETH, OF YOMAN, WASHINGTON.

FOLDABLE MILKING-PAIL HOLDER.

Application filed March 1, 1927. Serial No. 171,871.

This invention relates to foldable milking pail holders and has as one of its objects to provide a milking pail holder that may be folded in a compact form for shipping or other purposes.

Another object of the invention is to provide a milking pail holder that will comfortably support the pail on the knees of the milker.

A further object of the invention is to provide a milking pail holder that may be adjusted as to a proper inclination for receiving milk from the cow.

A further object of the invention is to provide a milking pail holder that is simple to construct and install, cheap to manufacture and highly efficient in its operation.

With these and other objects in view reference is now had to the accompanying drawings in which—

Fig. 1 is a perspective view of the device;

Fig. 2 is a side elevation of a pail showing device installed thereon;

Fig. 3 shows a fragment of a knee strap and means of securement therefor;

Fig. 4 is a side elevation of the knee strap;

Fig. 5 shows the application of the device, and

Fig. 6 shows a fragment of the device in the folded position.

Having reference to the drawings like numerals refer to like parts throughout the several views, and the numeral 1 refers to the usual milking pail, which when being used in the operation of milking, is ordinarily placed between the knees of the milker 2, represented by the dotted line in Fig. 5.

Ordinarily the milking pail 1 is held in an inclined position to best receive the milk from the animal 3 by pressure exerted by the knees of the milker, which in itself is at least tiresome, and objectionable in that it provides an insecure rest for the milking pail.

To overcome the objectionable features a milking pail holder 4 is provided, and consists of a circular ring strap 5, adapted to receive the milking pail and having an adjusting means consisting of a plurality of rings 6 formed in the strap with a bolt 7 provided to join the ends of the strap together by means of the respective rings.

At diametrally opposite points on the strap corrugations 8 are formed integral with the strap, and attached to the strap at these corrugations are knee hooks 9 having their lower ends shaped, as at 10, whereby the lower end may engage any one of the corrugations 8 for adjustment purposes, with the shaped end formed sufficiently loose about the strap to permit the knee hooks to fall flat in a plane corresponding to the plane of the ring strap when folded.

The knee hooks comprise uprights 11 which are normally extended upward to be bent back upon themselves, as shown plainly in Figs. 3 and 4, as at 12, and extend in diametrally opposite positions to form hooks 13 wherewith to support the device on the milker's knees.

To adjust and maintain the angle of inclination of the knee hooks, standards 14 are provided, and these standards are likewise foldably attached to the ring strap to collapse with the folding of the device, and they are secured against lateral displacement by being positioned upon the ring strap adjacent to the outer end of the corrugations, and have joining their upper ends a notched strap 15, notches 16 thereof being elongated to receive the double wires of the fold 12 of the upright 11.

It will now be noted by referring to Fig. 1 that by engaging one of the outside corrugations with the formed end 10 and inclining the upright to enter a notch 16 in the opposite direction that a maximum of inclination of the ring strap may be obtained, or by various adjustments in any of the corrugations and the notches that any adjustment may be obtained to suit the milker.

It may here be noted that adjustment of the milking pail depends somewhat upon the milker and the size of the animal, however the milking pail will rest more comfortably at an inclined angle when the knee hooks are adjusted as nearly as possible to a line representing the center of gravity of the tilted milking pail, and hence the adjustable feature which provides that, with the notches of the strap conforming to the respective convolutions of the corrugations, the necessary adjustment may be made by one end of the upright being secured to the ring strap and the other end being seated in the notches, when in the operable position.

The standards are normally maintained in a vertical position when the milking pail is inserted in the ring strap by means of a bearing tail 17 which rests against the milking pail, and the knee hooks are seured in the notches 16 by means of clips 18 that are slidably mounted on the folded end 12 of the upright 11, with an offset 19 provided to engage the back of the notched strap 15. By this means the knee hook is secured firmly in the vertical position, and by its general elongated form (it consisting of two wires) and seating in the elongated notch, to be held therein by the offset 19, the possibility of rotation of the knee hook is eliminated.

As practically all milking pails have a smaller diameter at the bottom than at the top, a means to secure the holder on the milking pail is provided consisting of an upright 20 foldably secured on the ring strap, and provided on its upper end with an inturned corrugated extension 21 wherewith to secure the device to the top of the bucket.

In transportation the parts may be folded into a relatively flat package, and in use the device will be unfolded and placed upon the milking pail, to be secured there by the aforementioned upright 20.

The milker will now adjust the knee hooks to the position most suitable to himself and proceed to fill the milking pail in the usual manner of milking.

Where a number of cows are to be milked the pails will be emptied into a container in the usual manner of procedure, and upon completing the milking the holder may be removed and hung in a convenient place for subsequent milking, thus leaving the pail free for cleansing purposes.

Having thus described my invention, I claim:

1. In a foldable milking pail holder, a ring strap, knee hooks attached to and diametrally positioned on said ring strap, and means to adjust the angle of inclination of said knee hooks.

2. In a folding milking pail holder, an adjustable ring strap, diametrally positioned corrugations formed integral with said ring strap, knee hooks foldably attached to said corrugations, and means to adjust the angle of inclination of said knee hooks.

3. In a foldable milking pail holder, a ring strap adapted to receive a milking pail, diametrally positioned corrugations formed integral with said ring strap, knee hooks foldably attached to said corrugations, and standards foldably attached to said ring strap to control the angle of inclination of said knee hooks.

4. In a foldable milking pail holder, a ring strap adapted to receive a milking pail, diametrally positioned corrugations formed integral with said ring strap, knee hooks foldably attached to said corrugations and standards foldably attached to said ring strap and secured against lateral displacement, by said corrugations, and adapted to adjustably control the angle of inclination of said knee hooks.

5. In a foldable milking pail holder, a ring strap adapted to receive a milking pail, diametrally positioned corrugations formed integral with said ring strap, knee hooks foldably and adjustably attached to said corrugations, said knee hooks comprising uprights foldably secured to said corrugations, and provided with diametrally extended hooks, and standards foldably attached to said ring strap and secured against lateral displacement, by said corrugations, and adapted to adjustably control the angle of inclination of said knee hooks.

6. In a foldable milking pail holder, a ring strap adapted to receive a milking pail, diametrally positioned corrugations formed integral with said ring strap, knee hooks foldably and adjustably attached to said corrugations, said knee hooks comprising uprights foldably secured to said corrugations, and provided with diametrally extended hooks, and standards foldably attached to said ring straps and secured against lateral displacement by said corrugations, and comprising with said standards a notched strap joining the upper end of said standards, said notches being adapted to adjustably control the angle of inclination of said knee hooks.

7. In a foldable milking pail holder, a ring strap adapted to receive a milking pail, diametrally positioned corrugations formed integral with said ring strap, knee hooks foldably and adjustably attached to said corrugations, standards foldably attached to said ring strap, and secured against lateral displacement by said corrugations, said standards being joined together by a strap provided with notches spaced to conform to respective convolutions of said corrugations, said notches and said corrugations forming means to adjustably control the angle of inclination of said knee hooks.

8. In a foldable milking pail holder, a ring strap adapted to receive a milking pail, diametrally positioned corrugations formed integral with said ring strap, knee hooks foldably and adjustably attached to said corrugations, standards foldably attached to said ring strap, and secured against lateral displacement by said corrugations, said standards being joined together by a strap provided with notches spaced to conform to respective convolutions of said corrugations, said notches and said corrugations forming means to adjustably control the angle of inclination of said knee hooks, and a bearing tail attached to one of each pair of standards to normally maintain said standards in a vertical position against the pail, when said pail is inserted in the ring strap.

9. In a foldable milking pail holder, a ring strap adapted to receive a milking pail, diametrally positioned corrugations formed integral with said ring strap, knee hooks foldably and adjustably attached to said corrugations, standards foldably attached to said ring strap, and secured against lateral displacement by said corrugations, said standards being joined together by a strap provided with notches spaced to conform to respective convolutions of said corrugations, said notches and said corrugations forming means to adjustably control the angle of inclination of said knee hooks, a bearing tail attached to and formed integral with one of each pair of standards to normally maintain said standards in a vertical position against the pail, when said pail is inserted in the ring strap, and clips mounted on said knee hooks and engageable with said straps to secure said knee hooks in a fixed position and against rotation.

10. In a foldable milking pail holder, an adjustable ring strap adapted to receive a milking pail, diametrally oppositely positioned corrugations formed in said ring strap, uprights foldably attached to said corrugations, knee hooks formed integral with said uprights, standards foldably attached to said ring strap and secured against lateral displacement by said corrugations, said standards being joined together by a strap provided with notches spaced to conform to the respective convolutions of said corrugations and adapted to seat said uprights, clips slidably mounted on the upper end of said uprights and engageable with said notched straps, said clips being adapted to secure the uprights in said notches and prevent the rotation thereof, a bearing tail formed on one end of one of each pair of standards to normally maintain the standards in vertical position against said pail when inserted in the ring straps and means to secure said holder on said pail.

In testimony whereof I affix my signature.

ESTHER OVERBO GULSETH.